Figure 14:
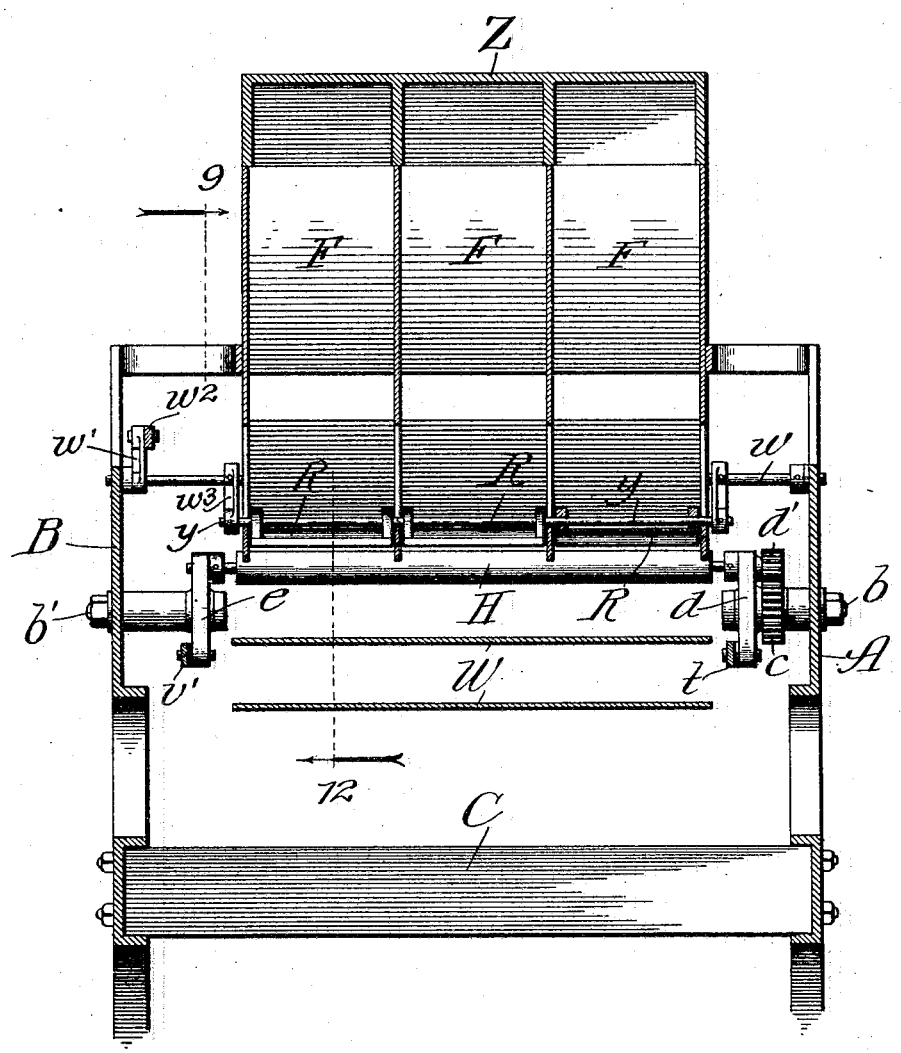

No. 766,432. PATENTED AUG. 2, 1904.
C. F. DIETZ.
DOUGH FORMING MACHINE.
APPLICATION FILED JAN. 30, 1904.
NO MODEL. 5 SHEETS—SHEET 1.
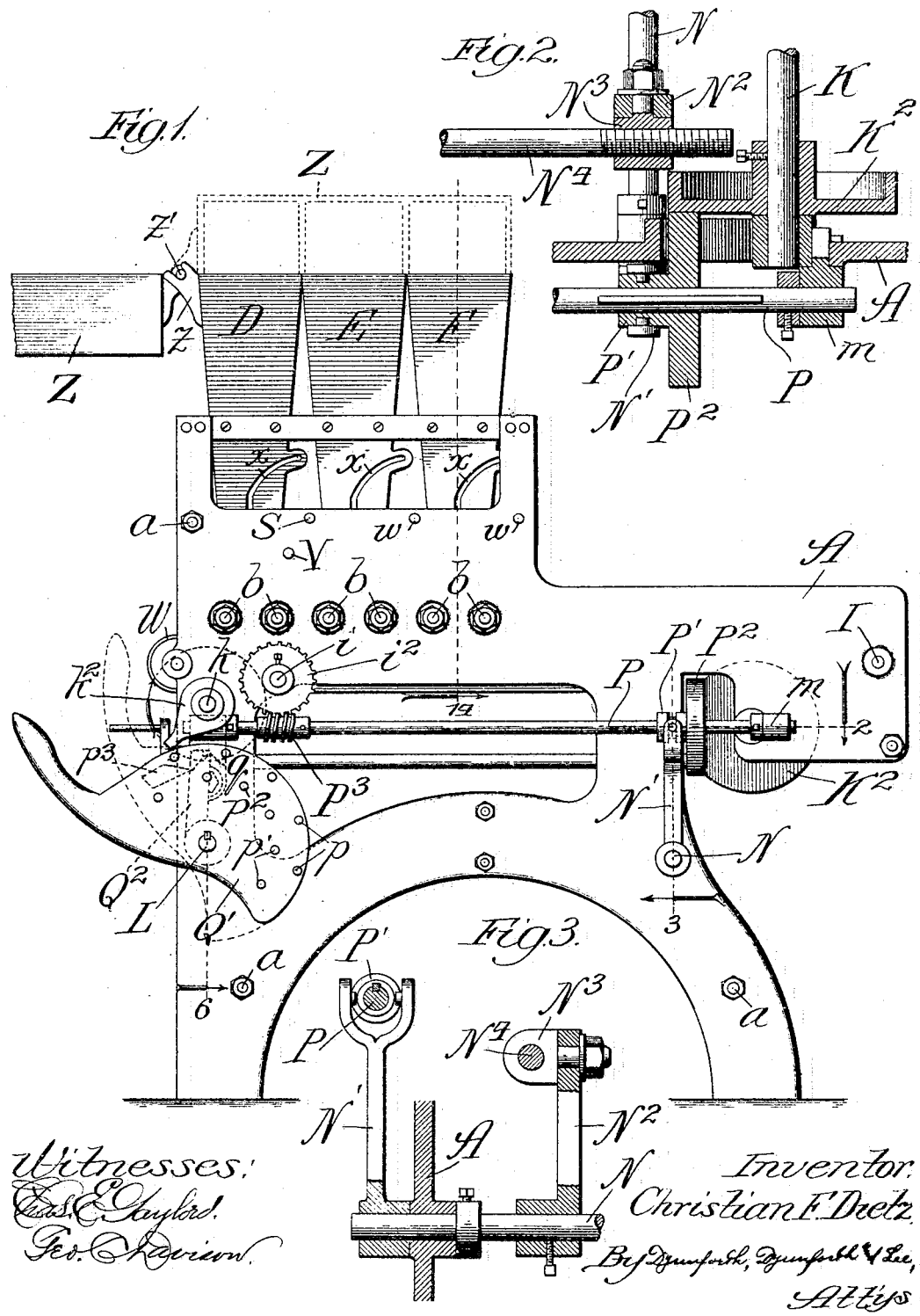
Witnesses:
Chas. E. Gaylord
Geo. Davison
Inventor
Christian F. Dietz
By Dunforth, Dunforth & Lee
Attys

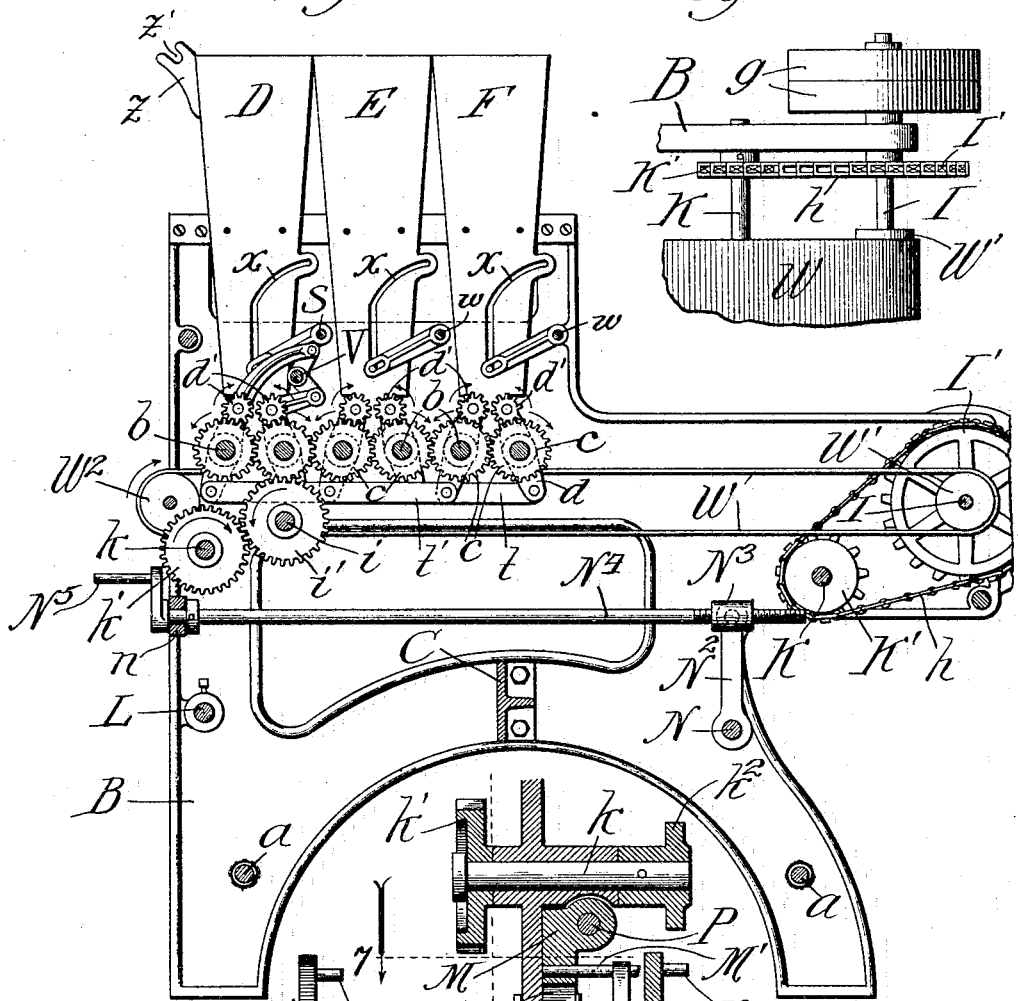

No. 766,432. PATENTED AUG. 2, 1904.
C. F. DIETZ.
DOUGH FORMING MACHINE.
APPLICATION FILED JAN. 30, 1904.
NO MODEL. 5 SHEETS—SHEET 3.
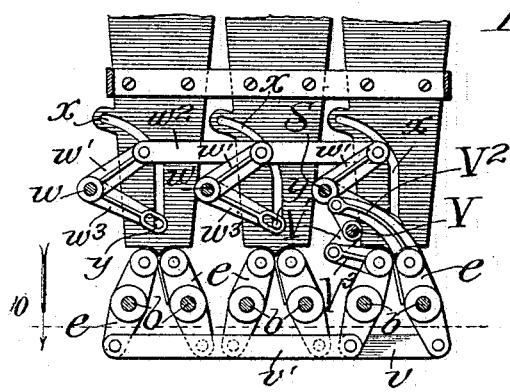
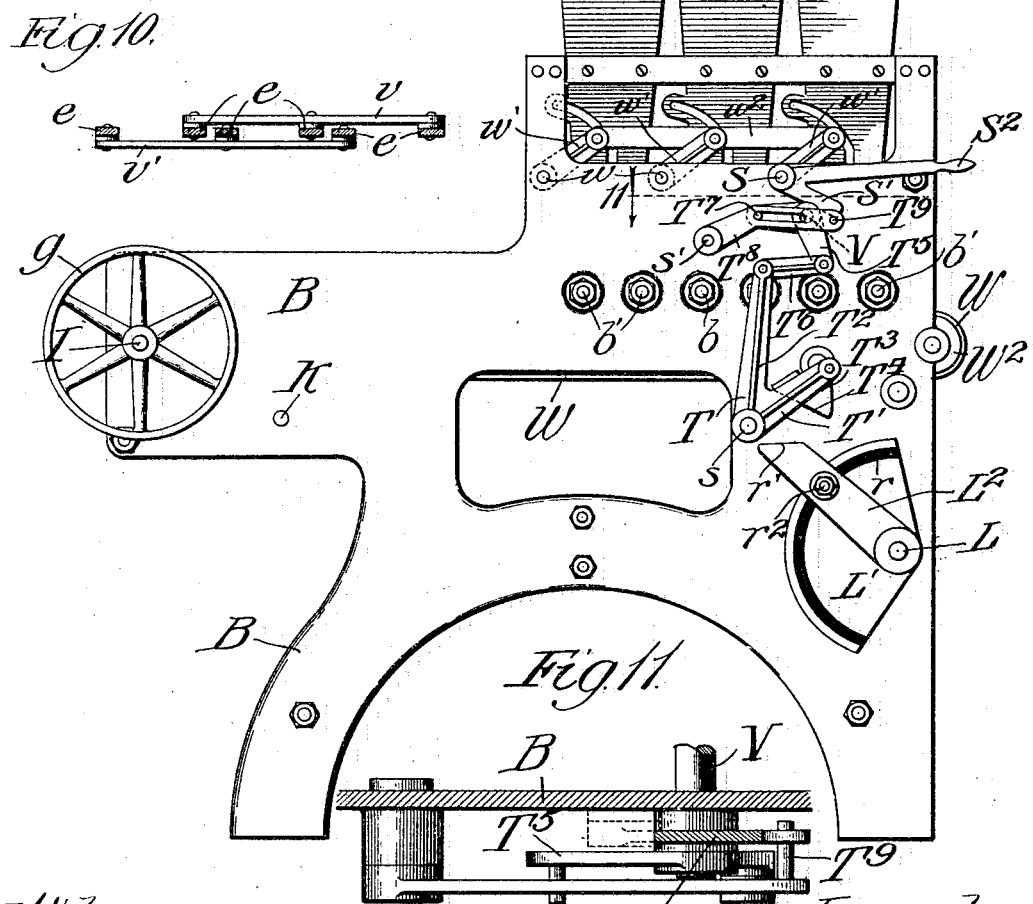

No. 766,432. PATENTED AUG. 2, 1904.
C. F. DIETZ.
DOUGH FORMING MACHINE.
APPLICATION FILED JAN. 30, 1904.
NO MODEL. 5 SHEETS—SHEET 4.
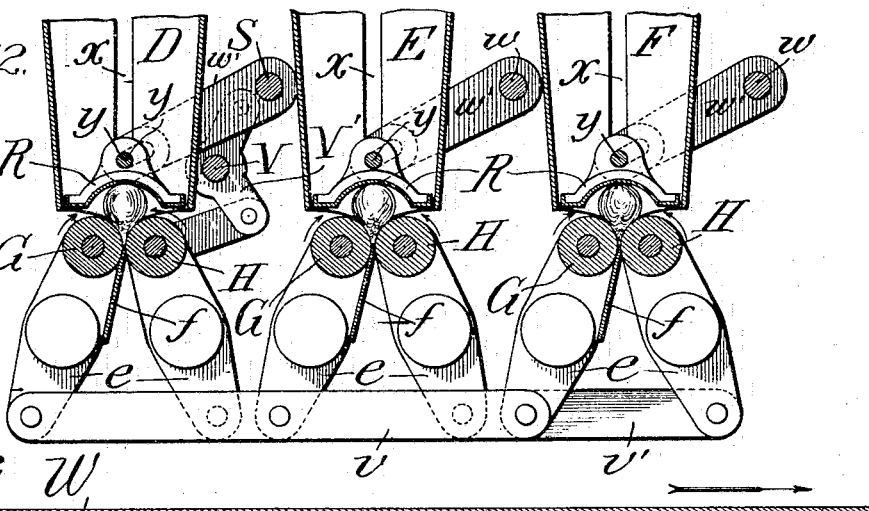
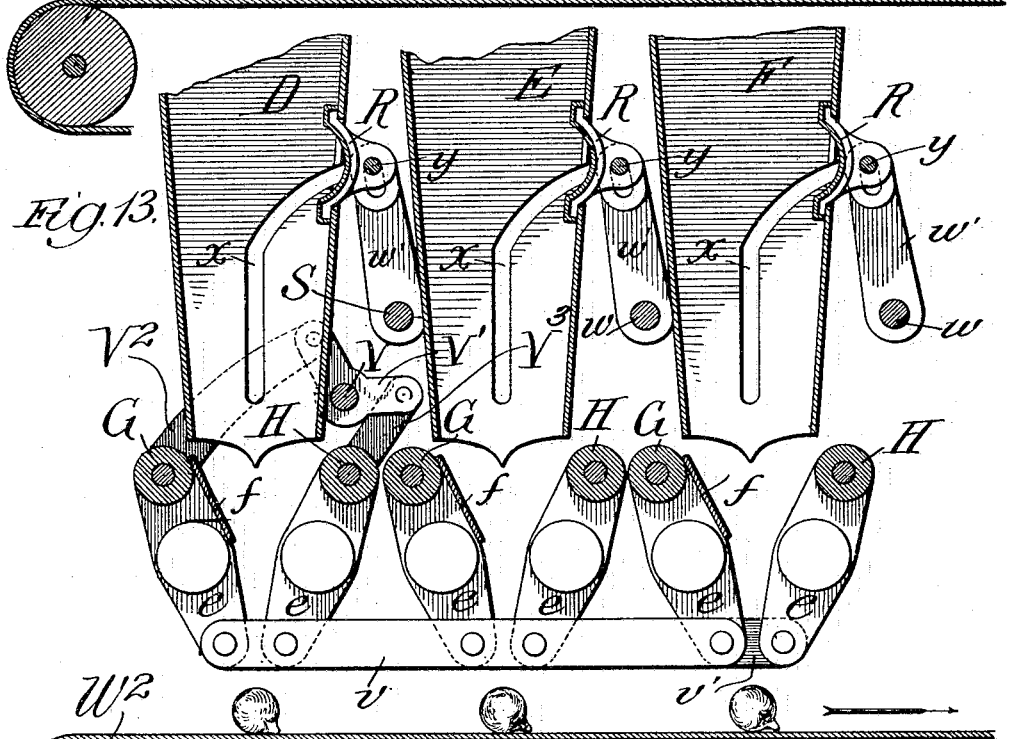

No. 766,432. PATENTED AUG. 2, 1904.
C. F. DIETZ.
DOUGH FORMING MACHINE.
APPLICATION FILED JAN. 30, 1904.
NO MODEL. 5 SHEETS—SHEET 5.

Witnesses:
Inventor:
Christian F. Dietz,
By Dyrenforth, Dyrenforth & Lee,
Attys.

No. 766,432. Patented August 2, 1904.

UNITED STATES PATENT OFFICE.

CHRISTIAN F. DIETZ, OF CHICAGO, ILLINOIS, ASSIGNOR OF TWO-THIRDS TO AUGUST JUNGE, OF CHICAGO, ILLINOIS, AND PHILLIP F. CARROLL, OF JOLIET, ILLINOIS.

DOUGH-FORMING MACHINE.

SPECIFICATION forming part of Letters Patent No. 766,432, dated August 2, 1904.

Application filed January 30, 1904. Serial No. 191,350. (No model.)

*To all whom it may concern:*

Be it known that I, CHRISTIAN F. DIETZ, a citizen of the United States, residing at Chicago, in the county of Cook and State of Illinois, have invented a new and useful Improvement in Dough-Forming Machines, of which the following is a specification.

My invention relates to improvements in machines for forming loaves of dough previous to the raising and baking operations.

My object is to provide a machine of generally improved construction for use in practicing a method of forming loaves of dough described and claimed by me in a separate concurrent application for Letters Patent filed in the United States Patent Office on the 30th day of November, 1903, and bearing Serial No. 183,147.

It is also my object to provide a machine for practicing said invention which will be of comparatively simple, strong, and durable construction, easy to operate, and capable of forming and discharging the loaves with great rapidity.

Referring to the drawings, Figure 1 is a partly-broken view showing an elevation of one end of the machine; Fig. 2, an enlarged broken plan section taken on line 2 in Fig. 1; Fig. 3, an enlarged broken section taken on line 3 in Fig. 1; Fig. 4, a broken sectional elevation taken on line 4 in Fig. 6; Fig. 5, a broken plan view of the main driving mechanism; Fig. 6, an enlarged broken section taken on line 6 in Fig. 1; Fig. 7, a broken plan section taken on line 7 in Fig. 6; Fig. 8, an elevation of the end of the machine opposite that shown in Fig. 1; Fig. 9 a broken sectional elevation taken on line 9 in Fig. 14; Fig. 10, a section taken on line 10 in Fig. 9; Fig. 11, an enlarged plan section taken on line 11 in Fig. 8; Figs. 12 and 13, enlarged sections, both taken on line 12 in Fig. 14; and Fig. 14, an enlarged section taken on line 14 in Fig. 1.

The main frame of the machine consists of end cheeks A B, connected together by a cross-beam C, tie-rods $a$, and also by shafts, as will hereinafter appear.

Mounted in the upper part of the frame are stationary hoppers D, E, and F, rigidly fastened in the main frame and open at their upper and lower ends. Each of the hoppers is divided into compartments, which may be three in number, as shown in Fig. 14, so that the present machine is adapted, as will presently appear, to form nine loaves of dough at one time. Fastened to the cheek A are six parallel inward-extending stub-shafts $b$, and in direct line therewith and fastened to the cheek B are six parallel inward-extending stub-shafts $b'$. Journaled upon the shafts $b$ is a train of intermeshing gear-wheels $c$ and links or levers $d$. Fulcrumed upon the shafts $b'$ are levers $e$, corresponding with the levers $d$. Journaled at opposite ends in companion levers $d$ $e$ are dough-forming friction-rollers G H, adapted when closed together, as shown in Fig. 12, to close the lower ends of the hoppers D E F. On the levers $d$ $e$, which carry the rollers G, are cross-extending plates $f$, which when the rollers are together, as shown in Fig. 12, extend at their upper edges into the bite of the companion rollers and operate as scrapers, as hereinafter set forth.

I is the main drive-shaft, journaled toward opposite ends in the cheeks A B, and carrying beyond the cheek B fast and loose belt-pulleys $g$. Parallel with the shaft I and journaled toward opposite ends in the cheeks A B is a counter-shaft K. At the cheek B the shaft I carries a sprocket-wheel I', geared by a sprocket-chain $h$ to a sprocket-pinion K' on the shaft K. At the cheek A the shaft K carries a friction-disk K². On the inner side of the cheek A, in the position shown, is a stub-shaft $i$, carrying a gear-wheel $i'$, meshing with one of the train of gears $c$, as shown in Fig. 4. Journaled in the cheek A, in the position shown, is a short shaft $k$, provided at the inner side of the cheek with a gear-wheel $k'$, meshing with the gear-wheel $i'$.

L is a rock-shaft journaled toward opposite ends in the cheeks A B. On the outer surface of the cheek A, beneath the shaft $k$, (see Figs. 6 and 7,) is a vertically-sliding block M, having an elongated opening $l$, through which it is fastened to the cheek by the bolt $l'$. Journaled in the cheek A, in the position shown in Figs. 1 and 4, is a rock-shaft N, (see Fig. 3,) provided at its outer end with an upwardly-extending arm N', having a bifurcated upper end. Journaled at one end in a pivotal bearing $m$ on the cheek A and at its opposite end in the vertically-sliding block M is a shaft P, having a grooved collar P' feathered thereon, which collar is pivotally engaged by pins in the upper bifurcated end of the arm N'. Also upon the shaft N at the inner side of the cheek A is an upward-extending arm $N^2$, to the upper end of which is pivotally secured a block $N^3$, having a threaded opening through it. A shaft $N^4$ extends through a bearing $n$ at the forward end of the machine and is threaded at its rear end to pass through the threaded head or block $N^3$. On the forward end to the shaft $N^4$ is an operating-crank $N^5$. Integral with the collar P' is a friction-wheel $P^2$ at right angles to and engaging at its circumferential face the face of the friction-disk $K^2$. Also upon the shaft P is a worm $P^3$, engaging a worm-wheel $i^2$ on the shaft $i$. Thus it will be seen that the shaft K, driven from the shaft I, drives the shaft P through the friction engagement of the disks $K^2$ $P^2$ and through its worm-gear connection with the shaft $i$ rotates the gear $i'$ and through the latter the gear $k'$ and also the train of gears $c$. The relative speed of rotation of the shaft P may be varied by shifting the friction-wheel $P^2$ along the disk $K^2$, which operation is performed by turning the crank $N^5$.

On the ends of the rollers G H, beyond the links $d$, are pinions $d'$, meshing with the gear-wheels $c$, whereby in the rotation of the train of gears the pairs of rollers G H are rotated, respectively, in opposite directions, as indicated by the arrows in Fig. 12.

Keyed to the shaft L beyond the cheek A is a sleeve Q, formed integrally with which is a lever Q', provided with an outer segmental series of pins $p$, placed, as indicated in Fig. 1, on the outer face of the lever, and an inner segmental series of openings $p'$ in the relative positions indicated in Fig. 1, adapted to receive pins $p^2$ at the inner side of said lever. Loosely fulcrumed upon the sleeve Q is an arm or lever $Q^2$, provided in its upper edge at the rear side with a notch $q$, in which a pin M', carried by the block M is adapted to rest. On the inner face of the lever Q' is a cam projection $p^3$. (See Fig. 1.) The shaft $k$ carries at its outer end an arm or wiper $k^2$, formed as shown in Fig. 1, and in the plane of the pins $p$, as shown in Fig. 6.

In operation to practice my aforesaid method lumps of dough are dropped into the hopper compartments upon the rollers G H and subjected to rotary frictional action by said rollers, whereby the skin portions of the lumps are drawn and stretched from the top down opposite sides to the center of the under side, by which action each lump is compacted, the skin portion is rendered smooth, and the surplus skin portion is deposited into that part of the lump which is intended to form the base or under side of the loaf of bread when baked. The amount of frictional operation to which a lump of dough should be subjected by the rollers to produce the desired results will depend upon the character of the dough. As in a bakery a comparatively large mass of dough is mixed and prepared at one time, a little skill on the part of the operator will enable him to determine very quickly whether lumps taken from the mass shall be subjected to two, four, or more revolutions of the rollers G H.

The pin M', resting in the notched end of the arm $Q^2$, holds the worm $P^3$ in engagement with the worm-wheel $i^2$. Initially the lever Q' is raised by the operator to the position shown by dotted lines in Fig. 1. In each revolution of the shaft $k$ the arm $k^2$ wipes across and advances a pin $p$, and thus turns the lever Q' and shaft L a distance equal to the movement of the respective pin $p$ while engaged by the arm $k^2$. A pin $p^2$ is permanently fixed in the opening $p'$ to the left of the series in Fig. 1. Another pin $p^2$ may be placed at will in any one of the other openings $p'$, the gearing being such that each opening $p'$ marks two complete revolutions of the rollers G H. Presuming that two revolutions only of the said rollers are desired, the operator will place a pin $p^2$ in the opening $p'$ next adjacent to the first said opening. The movement described of the lever Q' under the action of the arm $k^2$ will thus at the proper moment cause the inserted pin $p^2$ to engage the lever or arm $Q^2$ and move it out of engagement with the pin M'. When the pin M' is thus released, the block M may drop upon the guide-pin $l'$, thereby disengaging the worm $P^3$ from the worm-wheel $i^2$, causing the shaft $i$ and all parts actuated therefrom to stop. For the next operation the operator raises the lever Q' to the position indicated by dotted lines in Fig. 1, causing the cam $p^3$ to engage the under surface of the pin M' to raise the worm $P^3$ into engagement with the worm-wheel $i^2$, and in the final movement of the lever to its raised position the first or permanent pin $p^2$ engages the rear side of the arm $Q^2$ and moves it at its notch under the pin M' to hold the block M and attendant parts in the raised position. It is considered desirable, particularly in the formation of loaves for certain kinds of bread, to subject the lumps of dough to pressure from the upper side while they are being acted upon by the friction-rollers G H. For this purpose I provide at each compartment a weight or cover R, with means for moving it out of the way to permit a lump of dough to be dropped upon the rollers and for placing it upon the lump when the latter has been inserted into the compartment. I also provide means in the present machine for discharging the loaves of dough after they have been acted upon by the friction-rollers G H.

Keyed upon the end of the shaft L which is beyond the cheek B is a segmental plate L', presenting a T-groove $r$ in its outer face. Loosely fulcrumed upon the shaft L is a lever L$^2$, having a cam-faced end $r'$ and carrying a bolt $r^2$, having a head entering the T-groove $r$, whereby the arm or lever may be fastened in any adjusted position against the plate L'. Journaled at opposite ends in the cheeks A B is a rock-shaft S, provided beyond the cheek B with a downward-inclined arm S' and a lever or handle S$^2$. Also journaled at opposite ends in the cheeks A B is a rock-shaft V. Fulcrumed upon the outer side of the cheek B at $s$ is a bell-crank lever T, having an inclined arm T' and an upward-extending arm T$^2$. The arm T' carries a weight or block T$^3$, presenting an inclined cam-face T$^4$ in the path of the end $r'$ of the arm L$^2$. Keyed to the shaft V is a bell-crank lever T$^5$, having a downward-extending arm pivotally connected, by means of a link T$^6$, with the upper end of the arm T$^2$ and provided at the end of its other arm with a laterally-extending pin T$^7$. Fulcrumed at $s'$ on the cheek B is an arm or lever T$^8$, provided between its ends with a longitudinal slot engaging the pin T$^7$, and provided toward its outer end with a pin T$^9$, bearing against the under side of the arm S'. On the shaft V between the ends of the hoppers and the cheeks A B are bell-crank levers V'. All the levers $d$ carrying rollers H are pivotally connected at their lower ends to a horizontally-extending bar $t$, and all the levers $d$ carrying rollers G are pivotally connected at their lower ends by a horizontally-extending bar $t'$. All the levers $e$ carrying rollers G are pivotally connected at their lower ends to a horizontal bar $v$, corresponding with the bar $t'$, and all the levers $e$ carrying rollers H are pivotally connected at their lower ends to a horizontal bar $v'$, corresponding with the bar $t$. The upper arms of the bell-crank levers V' are connected, by means of links V$^2$, with the shaft of the forward roller G, and the lower arms of the bell-crank levers V' are connected by means of links V$^3$ with the shaft of the forward roller H. The arm L$^2$ would be adjusted in the T-groove $r$ of the segment L', whereby its end $r'$ will contact with the face T$^4$ of the block T$^3$ just as the shaft L is nearing the end of its movement. In the final movement of the arm L$^2$ it moves the block T$^3$ and swings the bell-crank lever T to draw the bell-crank lever T$^5$, raise the bell-crank lever T$^8$, and cause the pin T$^9$ to raise the arm S' and rock the shaft S. The bell-crank lever T$^5$ rocks the shaft V and turns the bell-crank levers V', causing them to swing the first pair of rollers apart and through their connections at the lower ends swing all the pairs of rollers apart to the positions shown in Fig. 13. Thus it will be understood that when the loaves of dough have been formed by the rollers the rollers are spread apart to permit the loaves to drop from the lower ends of the hopper-compartments. A belt W, running over a roller W' on the shaft I and over a roller W$^2$, journaled upon a shaft at the forward end of the machine, is in position to receive all the loaves as they are dropped from the hopper-compartments and move them in the direction of the arrow to the discharge end of the machine.

The shaft S extends between the two forward hoppers D E, and parallel therewith are shafts $w$, also journaled at opposite ends in the cheeks in the positions indicated. In the hopper ends and also in the partitions which separate the hopper-compartments are slots $x$. Extending longitudinally through the hoppers in the said slots are shafts $y$, carrying the weights R. On opposite end portions of the shaft S are inclined arms $w'$, and on the shafts $w$ are similar arms $w'$, all the arms at each end being pivotally connected together by a horizontally-extending bar $w^2$. Also upon the shafts S $w$ at each end of the machine are arms $w^3$, provided in their free end portions with longitudinally-extending slots engaging the ends of the shafts $y$.

When the arm S' is raised by the pin T$^9$, as before described, it rocks the shaft S and swings the arms $w'$ thereon, and consequently all the arms $w'$, rocks the shafts $w$, and raises the shafts $y$ in the grooves $x$, carrying the weights R to the out-of-the-way positions shown in Fig. 13. The rocking of the shaft S to produce this result may also be effected at any time by raising the lever S$^2$.

From the foregoing description it will be understood that by properly positioning a pin $p^2$ in the lever Q' all the rollers G H may be rotated two, four, or more times in each operation. The arm L$^2$ is adjusted to correspond with the said pin $p^2$, whereby at the completion of the desired number of revolutions of the said rollers the lever mechanism on the cheek B will be actuated to spread the rollers apart and discharge the finished loaves of dough and at the same time raise the weights R to permit fresh lumps of dough to be dropped into the hopper-compartments. At the end of the loaf forming and dumping operations the lever Q' may be raised by the operator to permit the weight T$^3$ to return the rollers to their closed positions, as indicated in Fig. 12. Then after the hopper-compartments have been provided with a fresh lot of dough the lever S$^2$ may be lowered to cause the weights R to rest upon the lumps of dough. Thereafter the lever Q' may be further moved to the position indicated by dotted lines in Fig. 1 to start operations, as before described.

To facilitate charging the hopper-compartments with lumps of dough, I provide on the hopper D brackets $z$, presenting sockets $z'$. A tray Z (or any number of such trays) is provided of a size to cover all the hoppers D, E, and F and is divided off into compartments corresponding with the hopper-compartments. On the ends of the trays are pivot-pins to fit into the socket $z'$. To charge the machine, a lump of dough is dropped into each of the compartments of the tray, and the tray is caused to rest at its said pins in the sockets $z'$ of the brackets $z$, after which the tray is turned over upon the hoppers, as indicated by full lines in Fig. 14 and by dotted lines in Fig. 1, whereby all the lumps of dough will drop from the tray-compartments into the hopper-compartments. Thus all the hopper-compartments are charged in one operation.

The method which my improved machine is intended to practice consists in subjecting a lump of dough to the friction action of rollers or equivalent moving bodies, whereby the surface or skin portion of the lump is drawn toward one side, which would be the under side or base of the loaf when baked into bread, applying the surface skin to the said side and at the same time compacting the lump. Drawing of the skin portion, as described, has the effect of smoothing the upper surfaces of the loaf and results in a loaf of bread having a smooth and comparatively thin crust portion and an interior substantially uniform throughout and possessing especially-desirable characteristics. The best means known to me for producing the desired results consists in subjecting the lump to the action of oppositely-rotating rollers with a scraper between the rollers, as described, whereby the skin portion of the dough is stretched and drawn in the direction of the under side of the loaf and deposited therein, the scraper operating to prevent any portion of the dough from being drawn through the bite of the rollers. The present machine operates in this manner, and, as shown, it is intended to form loaves of dough which will produce loaves of bread of the established length and size in cross-section. In the movement of the rollers and consequent drawing and stretching of the skin portion gas bubbles are expelled and the lump is compacted and elongated against opposite ends of the compartment. In manufacturing loaves of the Vienna type, which are comparatively long and narrow, the hopper-compartments may be dispensed with.

The machine shown and described forms a convenient and effective means for forming the loaves with great rapidity. The weights R described present smooth concave surfaces to the upper surfaces of the loaves while being formed, which surfaces do not interfere with the stretching and drawing operation and tend to prevent breaking or parting of the skin portion under the stretching operation. The weights are desirable, but not an indispensable feature of my invention. I prefer to discharge the lumps when formed by producing separation of the rollers as described, whereby the lumps may fall upon a table or traveling belt, as described; but other means may be provided, if desired, for removing the finished loaves of dough.

My improved machine may be constructed to form any desired number of loaves at one time and may be modified in various ways without departing from the spirit of my invention as defined by the claims. Instead of single rollers G H clusters of rollers may be provided to operate against the opposite sides of the lump of dough. Such clusters would be the equivalent of the single rollers described, and in the claims the terms " pair of coöperating members" or " pair of coöperating rollers" is intended to include a plurality or clusters of rollers at each side in place of the single rollers G H described.

What I claim as new, and desire to secure by Letters Patent, is—

1. In a machine for forming a loaf from a lump of dough, substantially as described, the combination of a pair of coöperating members presenting friction-surfaces forming a bearing for the lump, and holding it against turning and means operating to move said members in the direction toward one side of the lump and thereby stretch the skin portion of the lump substantially as herein set forth.

2. In a machine for forming a loaf from a lump of dough, substantially as described, the combination of a pair of coöperating rollers, presenting friction-surfaces forming a bearing for the lump and holding it against turning, and means operating to rotate said rollers in the direction toward one side of the lump, and thereby stretch the skin portion of the lump, substantially as herein set forth.

3. In a machine for forming a loaf from a lump of dough, substantially as described, the combination of a pair of coöperating rollers, presenting friction-surfaces forming a bearing for the lump and holding it against turning, means operating to rotate said rollers in the direction toward one side of the lump and thereby stretch the skin portion of the lump, and means for preventing the passage of the dough between said rollers, substantially as herein set forth.

4. In a machine for forming a loaf from a lump of dough, substantially as described, the combination of a pair of coöperating rollers presenting friction-surfaces forming a bearing for the lump, means for rotating said rollers in the direction toward one side of the lump, and a scraper interposed between said rollers, to operate substantially as herein set forth.

5. In a machine for forming a loaf from a lump of dough, substantially as described, the combination of a pair of coöperating members, presenting friction-surfaces forming a bearing for the lump, means for preventing the passage of dough between the members during the forming operation, and means for spreading said members apart to discharge the loaf, substantially as and for the purpose set forth.

6. In a machine for forming a loaf from a lump of dough, substantially as described, the combination of a pair of coöperating rollers, presenting friction-surfaces forming a bearing for the lump, means for rotating said rollers in the direction toward one side of the lump, supporting means for said rollers and means for moving said supports to spread the rollers apart and discharge the loaf, substantially as and for the purpose set forth.

7. In a machine for forming a loaf from a lump of dough, substantially as described, the combination of a pair of coöperating rollers presenting friction-surfaces forming a bearing for the lump, means for rotating said rollers in the direction toward one side of the lump, supports for said rollers and a scraper on the support of one roller extending between the said rollers, substantially as and for the purpose set forth.

8. In a machine for forming a loaf from a lump of dough, substantially as described, the combination of a pair of coöperating rollers, presenting friction-surfaces forming a bearing for the lump, relatively movable supports for said rollers, rotating means for the rollers and a scraper on one of said supports extending between the rollers, substantially as and for the purpose set forth.

9. In a machine for forming a loaf from a lump of dough, substantially as described, the combination of a pair of coöperating members presenting friction-surfaces forming a bearing for the lump at one side, means for moving said members in the direction toward one side of the lump, and means for engaging and pressing the lump against said members, substantially as and for the purpose set forth.

10. In a machine for forming a loaf from a lump of dough, substantially as described, the combination of a pair of coöperating members presenting friction-surfaces forming a bearing for the under side of the lump, means for moving said members in the direction toward the under surface of the lump, and an adjustable weight bearing upon the upper portion of said lump, substantially as and for the purpose set forth.

11. In a machine for forming a loaf from a lump of dough, substantially as described, the combination of a pair of coöperating members presenting friction-surfaces forming a bearing for the under side of the lump, means for moving said members in the direction toward the under surface of the lump, and an adjustable weight having a concave under surface bearing upon the upper portion of said lump, substantially as and for the purpose set forth.

12. In a machine for forming a loaf from a lump of dough, substantially as described, the combination of a lump-receiving receptacle, a pair of coöperating members presenting friction-surfaces forming a bearing for the lump and holding it against turning in said receptacle, and means operating to move said members in the direction toward one side of the lump and thereby stretch the skin portion of the lump, substantially as herein set forth.

13. In a machine for forming a loaf from a lump of dough, substantially as described, the combination of a receptacle, a pair of coöperating rollers presenting friction-surfaces forming a bearing for the lump and holding it against turning in said receptacle, and means operating to turn said rollers in the direction toward one side of the lump, and thereby stretch the skin portion of the lump, substantially as herein set forth.

14. In a machine for forming a loaf from a lump of dough, substantially as described, the combination of a receptacle for the lump, a pair of coöperating rollers presenting friction-surfaces forming a bearing for the lump in said receptacle, means for rotating said rollers in the direction toward one side of the lump, and an adjustable weight in said receptacle for pressing the dough against the rollers, and operating substantially as herein set forth.

15. In a machine for forming a loaf from a lump of dough, substantially as described, the combination of a pair of coöperating members, presenting friction-surfaces forming a bearing for the lump, means for moving said members in the direction toward one side of the lump, means for spreading said members apart to discharge the loaf, and a traveling belt in position to receive the loaf as it is discharged, substantially as and for the purpose set forth.

16. In a machine for forming a loaf from a lump of dough, substantially as described, the combination of a receptacle for the lump, a pair of coöperating rollers at the lower end of said receptacle presenting friction-surfaces forming a bearing for the lump, means for rotating said rollers in the direction toward one side of the lump, a scraper device interposed between said rollers, relatively movable supports in which said rollers are journaled, a pivotally-supported weight in said receptacle movable from an out-of-the-way position to a position wherein it will press the lump against the rollers, and lever mechanism operatively connected with said roller-supports and with said weight whereby the weight is lifted and the rollers spread apart, substantially as and for the purpose set forth.

17. In a machine for forming loaves from lumps of dough, substantially as described, the combination of a plurality of pairs of coöperating members, presenting friction-surfaces forming bearings for the lumps and holding them against turning, and means operating to move all said members simultaneously, whereby the members of each pair move in the direction toward one side of the lump engaged thereby, and thus stretch the skin portions of the lumps, substantially as herein set forth.

18. In a machine for forming loaves from lumps of dough, substantially as described, the combination of a plurality of pairs of coöperating rollers presenting friction-surfaces forming bearings for the lumps and holding them against turning, and means operating to turn all said rollers simultaneously, whereby each pair turns in the direction toward one side of the lump bearing against them, and thereby stretch the skin portions of the lumps, substantially as herein set forth.

19. In a machine for forming a loaf from a lump of dough, substantially as described, a pair of coöperating rollers presenting friction-surfaces forming a bearing for the lump, a drive-shaft with which said rollers are operatively geared, and means interposed between said drive-shaft and rollers whereby the rollers may be given a predetermined number of revolutions in each loaf-forming operation, substantially as and for the purpose set forth.

20. In a machine for forming loaves from lumps of dough, substantially as described, the combination of a plurality of pairs of coöperating rollers presenting friction-surfaces forming bearings for the lumps and holding them against turning, a drive-shaft with which all said rollers are operatively geared, relatively movable supports for each pair of rollers, means interposed between the drive-shaft and rollers for starting and stopping rotation of said rollers and operatively connected with said supports, whereby when the rotation of said rollers is stopped the supports are moved to spread the rollers apart, substantially as and for the purpose set forth.

CHRISTIAN F. DIETZ.

In presence of—
    WALTER N. WINBERG,
    W. B. DAVIES.